April 11, 1961 C. J. DIGNEY 2,979,372

RECORD CLAMPING AND STRIPPING MECHANISMS
FOR FACSIMILE MACHINES AND THE LIKE

Filed Dec. 9, 1958 2 Sheets-Sheet 1

INVENTOR
CHARLES J. DIGNEY
BY John J. Rogan
ATTORNEY

April 11, 1961 C. J. DIGNEY 2,979,372

RECORD CLAMPING AND STRIPPING MECHANISMS
FOR FACSIMILE MACHINES AND THE LIKE

Filed Dec. 9, 1958 2 Sheets-Sheet 2

INVENTOR
CHARLES J. DIGNEY

BY John J. Rogan
ATTORNEY

United States Patent Office 2,979,372
Patented Apr. 11, 1961

2,979,372

RECORD CLAMPING AND STRIPPING MECHANISMS FOR FACSIMILE MACHINES AND THE LIKE

Charles J. Digney, Franklin Park, N.J., assignor, by mesne assignments, to Westrex Corporation, New York, N.Y., a corporation of Delaware Filed Dec. 9, 1958, Ser. No. 779,143
7 Claims. (Cl. 346—138)

This invention relates to facsimile machines and more particularly it relates to arrangements for loading and unloading a record sheet on to a rotating carrier or drum.

A principal object of the invention is to provide a facsimile machine of the rotary drum kind, having novel sheet clamping and sheet stripping mechanism, whereby the loading of the sheet on to the drum and the stripping or unloading of the sheet from the drum, can be effected expeditiously and positively with a minimum of manual manipulation.

A feature of the invention relates to a novel sheet clamping and stripping device for a rotary drum machine, which device is provided with operating mechanism on the interior of the drum and so disposed and arranged as to subject the drum to a minimum of centrifugal unbalancing when the drum is rotating at high speed.

A further feature relates to a simplified paper clamping arrangement of relatively light weight for use with a rotating carrier such as the rotating drum of a facsimile machine.

A further feature relates to the novel organization, arrangement and relative location and interconnection of parts which constitute a simple and relatively inexpensive paper clamping and stripping mechanism for rotary drum machines.

Other features and advantages not specifically enumerated will be apparent after a consideration of the following detailed descriptions and the appended claims.

In the drawing, which shows by way of example one preferred embodiment,

Figure 1:
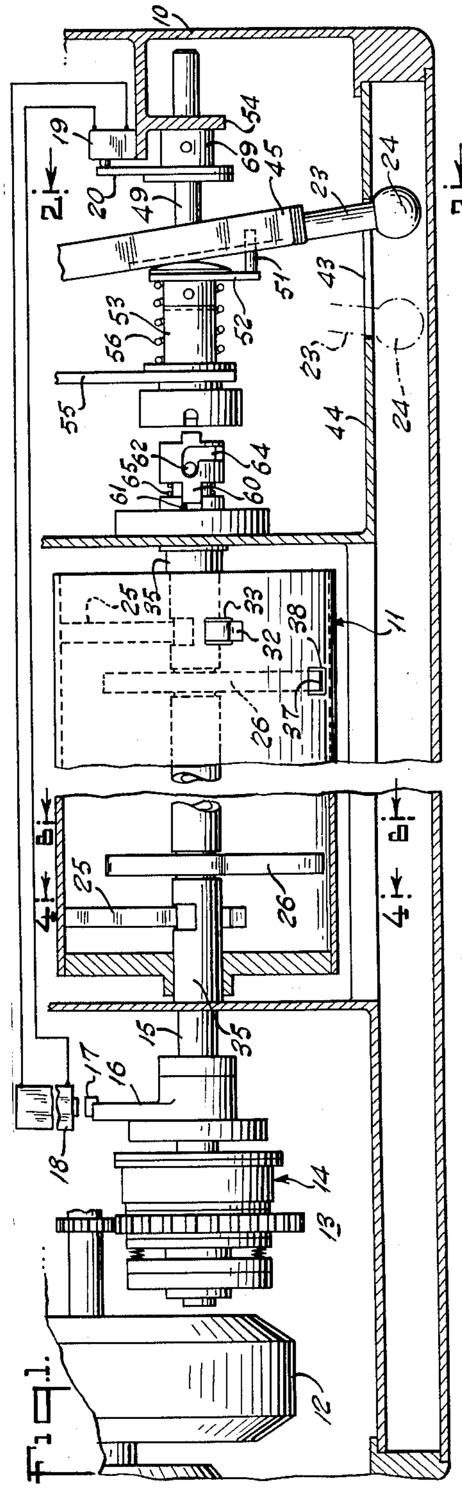
Fig. 1 is a top plan view, partly sectional, of the pertinent parts of a facsimile machine embodying the invention.

Inasmuch as the invention is concerned primarily with the paper clamping and stripping part of a facsimile machine, only those portions of such a machine are illustrated in the drawing as are necessary to an understanding of the invention. Thus, in Fig. 1 there is shown an outer casing 10 of any well known facsimile machine. Housed within the casing and suitably supported for rotation therein is a rotary scanning drum 11. Drum 11 is arranged to be driven at the required rotary scanning speed by an electric motor 12 preferably through a gear system 13 and a slip-friction clutch 14 so that the drum 11 can be stopped at the sheet loading or unloading position, without stopping the motor.

The drum shaft 15 carries a stop arm 16 which rotates in the path of a retractable phasing latch 17 which can be moved into and out of the path of arm 16 by a suitable electromagnet 18. The energizing circuit for magnet 18 can be controlled by a suitable switch, for example a stationarily mounted microswitch 19 which is normally closed, and connected to a suitable power supply (not shown). When it is desired to stop the drum, switch 19 is opened by disengagement from a shiftable plate 20 to be described hereinbelow. Therefore, the magnet 18 is deenergized and the drum is stopped by the latch 17.

The parts are so arranged and designed that when it is desired to load and unload a sheet of paper or other record blank 21 (see Fig. 5) on to the drum, the plate 20 is shifted to the left to cause the release of latch 17, which drops down, thus stopping the drum in a definite loading and unloading position with respect to a suitable paper insertion slot 22 in a wall of the casing 10. This stopping of the drum is controlled by a manually operable lever 23 having a hand knob 24 extending outwardly in front of the machine. The lever 23 is pivotally mounted so that it can be moved to the left from its normal full line position, as shown in Fig. 1, to the dot dash position shown therein. When it is so moved to the left, the lever 23 can then be rotated upwardly to the dot dash position shown in Fig. 2. The lever 23 is for the purpose of controlling the operation of the sheet clamping and stripping elements to be described. Two of the sheet clamping elements are shown in Fig. 1 and designated by the numeral 25. It will be understood, of course, that a series of these sheet clamping elements may be provided along the length of the drum. A corresponding series of sheet stripping elements designated 26 are also provided, there being preferably one such stripping element for each clamping element.

Figure 4:
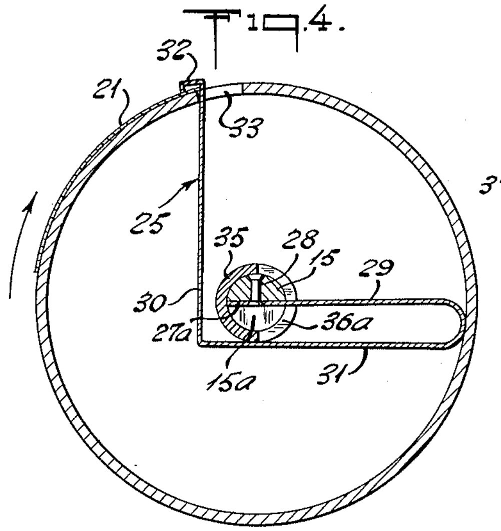
Fig. 4 is a sectional view of Fig. 1 taken along the line 4—4 thereof, showing one of the elements of the clamping mechanism in its clamped position.
Figure 6:
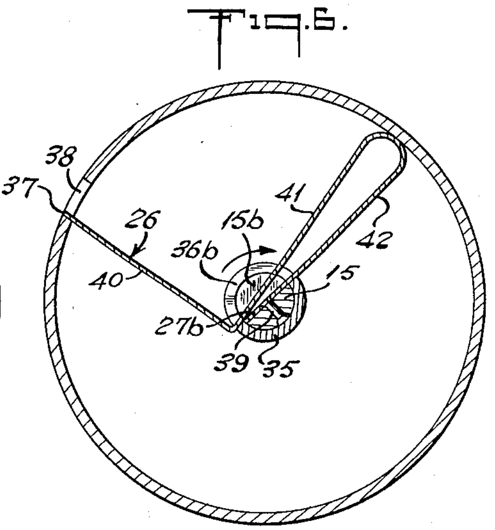
Fig. 6 is a sectional view of Fig. 1 taken along the line 6—6 thereof and showing one of the paper stripping elements in a position corresponding to the clamping position of the clamping element of Fig. 4.
Figure 5:
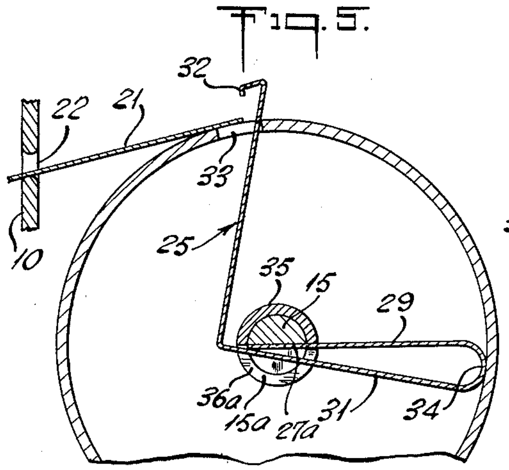
Fig. 5 is a view similar to that of Fig. 4, showing the clamping element in its unclamped position.
Figure 7:
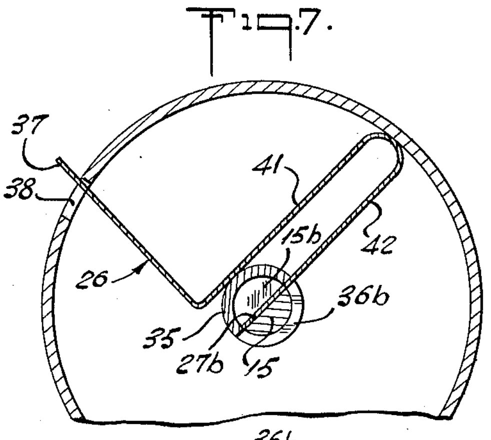
Fig. 7 is a view similar to that of Fig. 6 showing the stripping element in its stripping position.
Figures 9, 10:
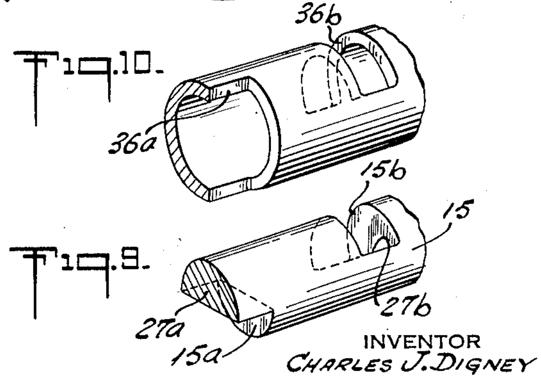
Fig. 9 is a perspective view of part of the drum shaft showing the respective notches for the clamping elements and the stripping elements.
Fig. 10 is a perspective view of part of the tubular camming sleeve showing the relation of the camming notches therein with respect to the notches in the shaft of Fig. 9.

Both the clamping elements and the stripping elements are in the form of relatively thin gauge spring strip stock and are attached to the drum shaft 15 in the manner indicated in detail in Figs. 4 to 7. Thus, as shown in Figs. 4 and 9, the drum shaft 15 is provided with a series of pairs of notches 15*a*, 15*b* spaced along the length of the shaft, each notch having a respective diametrically extending flat 27*a*, 27*b* at its base, the flats 27*a* and 27*b* being disposed for example at 45 degrees with respect to each other, as indicated in Figs. 4, 6 and 9. Attached to the flat 27*a* by means of a rivet or screw 28 is one arm 29 of one of the clamping elements 25. Each clamping element is preferably of one piece construction comprising substantially right angled portions 30, 31 and the bent-back arm portion 29. The arm 30 terminates in a paper gripping finger portion 32 which projects through a suitable slot 33 in the wall of the drum 11. The member 25 in its normal or unstressed condition has its arm 29 biased towards the arm 31, as shown in Fig. 5, and preferably, although not necessarily, the length of the arms 29 and 31 is such that the bend 34 abuts against the inner surface of the drum. It will be clear, therefore, that in its normal or unstrained condition each of the clamping elements 25 has its clamping end or finger 32 projecting through the slot 33 to an appreciable distance beyond the outer periphery of drum 11, as indicated in Fig. 5.

When it is desired to move the finger 32 of each clamping element to the clamping position as shown in Fig. 4, a tubular control sleeve 35, rotatably mounted on shaft 15, is turned from the position shown in Fig. 5 to the position shown in Fig. 4. This tubular sleeve has a plurality of pairs of cut-away notches 36a, 36b in registry with the corresponding notches 15a, 15b and their respective flats 27a, 27b on the shaft 15. It is clear, therefore, that when the sleeve 35 is rotated through an angle of 90 degrees from its position as shown in Fig. 5, each of the clamping members 25 has the arms 29, 31 thereof spread apart from their normal position, as shown in Fig. 5, to their spaced position, as shown in Fig. 4, thus effecting a simultaneous clamping movement of all of the clamping elements 25.

As pointed out above, associated with each clamping element is a paper stripping element 26. Each of these stripping elements is made of a one piece spring metal strip substantially the same as the above described clamping elements, except that the end 37 of each element extends through a corresponding slot 38 in the drum but does not have a clamping finger as do the clamping elements. Here again each of the stripping elements is located in a corresponding notch 15b in the shaft 15 and fastened to the flat 27b thereof by a rivet or screw 39. Likewise the tubular rotatable sleeve 35 above described also has a series of notches 36b in registry with the corresponding notches 15b in shaft 15. Preferably the notches 36b are staggered with respect to the notches 36a approximately 45 degrees around the sleeve 35, which notches 36b receive the stripping elements 26, which elements are fastened to the corresponding flats 15b on the shaft. Thus, the arm 40 of each stripping element 26 is disposed at an angle of approximately 45 degrees with respect to the corresponding arm 30 of the associated clamping element. Here again the arms 41 and 42 of each stripping element are normally biased towards each other, as shown in Fig. 6, but when the tubular sleeve 35 is rotated through an angle of about 90 degrees, the tubular member 35 cams the arms 41, 42 apart to the relation shown in Fig. 7, thus causing the end 37 of the stripping element to project beyond the surface of the drum where it engages the paper 21 to strip it from the drum surface.

The relation of the parts is such that when the tubular sleeve 35 is in the position shown in Fig. 4, the fingers 32 of the clamping elements firmly grip the paper 21 against the surface of the drum, and the arms 40 of the elements are retracted within the drum to the position shown in Fig. 6. When the sleeve 35 is rotated through 90 degrees for unloading purposes, the gripping fingers 32 extend beyond the drum to unclamp the edge of the paper 21 and at the same time the stripping fingers 37 extend through the drum to engage the paper and separate it from the drum surface, as shown in the corresponding views of Figs. 5 and 7. In the non-stripping position the ends 37 of the stripping elements do not protrude beyond the periphery of the drum.

It will be understood that the camming or control sleeve 35 is normally coupled to the shaft 15 for rotation therewith except when the drum is to be stopped for loading or unloading the paper sheet 21. When the drum is stopped by the latch 17 the sleeve 35 can be rotated to approximately 90 degrees from its normal position as seen in Figs. 4 and 6, to the position shown in Figs. 5 and 7.

Figure 3:
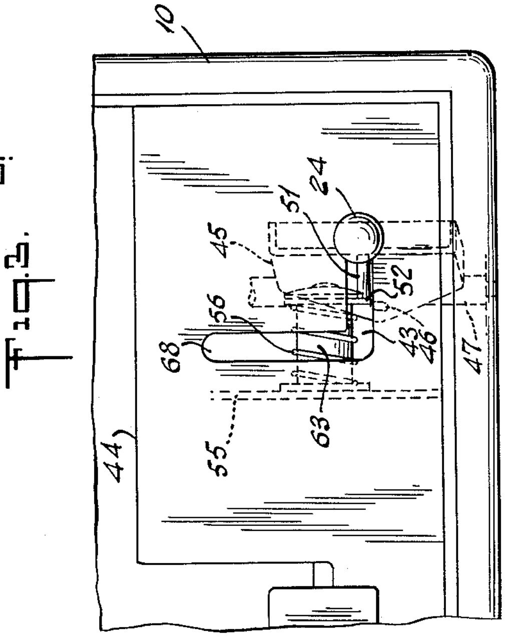
Fig. 3 is a left elevational view of part of Fig. 2.
Figure 2:
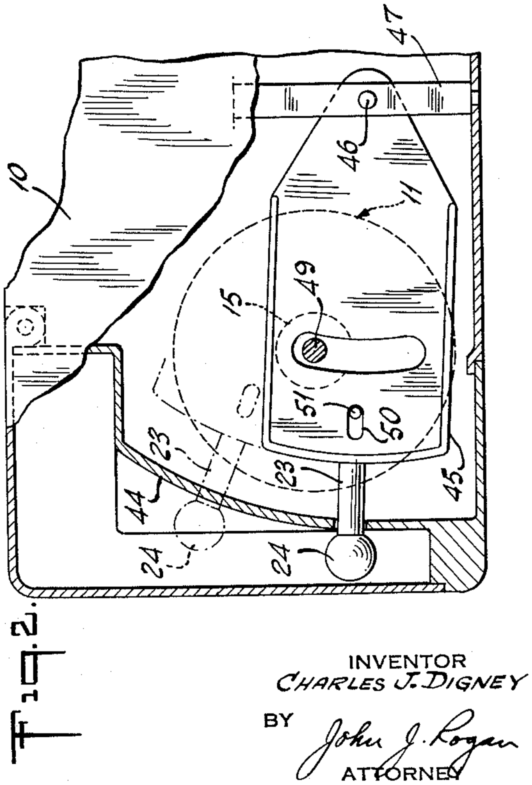
Fig. 2 is a sectional view of Fig. 1 taken along the line 2—2 thereof and viewed in the direction of the arrows.

When it is desired to load or unload the paper, lever 23 is moved to the left in the portion 43 of a right angled guiding slot in the wall 44. Lever 23 is attached to a plate 45 which is pivotally attached at 46 to a rotatable support 47 (Figs. 2 and 3). Plate 45 has an elongated arcuate slot 48 through which extends a slidably mounted and rotatable shaft 49, thus allowing the plate 45 to move along the shaft 49 while the said plate is capable of angular rotation around that shaft. Plate 45 has a small slot 50 which receives a pin 51 carried by plate 52 which is attached to a collar 53 which is pinned to shaft 49. Shaft 49 is mounted for sliding and rotational movement in brackets 54, 55 and is normally urged to the right by a coiled spring 56. Thus, lever 23 is also normally urged to the right hand end of slot 43. As shown more clearly in Fig. 8, the collar 53 has at its left end a flange 56a having a lip 57 with a small cut-away section 58 therein. Collar 53 is shown in its normal position in Fig. 1 wherein it is spaced from the slidable sleeve 59 on the end of drum shaft 15. Sleeve 59 has a splining lug 60 which is always in a slot 61 in the end of the camming sleeve 35. Shaft 15 has a radially extending pin 62 which passes through a right angled slot in the wall of sleeve 59. The part 63 of that slot extends parallel to the length of sleeve 56 while the other part 64 extends around the sleeve. A coiled spring 65 normally urges the sleeve 59 to the right in which position the shaft pin 62 is seated against the left hand end of slot portion 63, thus positively coupling the camming sleeve 35 with shaft 15 and preventing relative rotation between the camming sleeve and the drum shaft. The pin 62 is adapted to fit into the above described cut-away part 58 of collar 53 when the latter is moved to the left. Sleeve 59 also carries a lug 66 which is adapted to enter a corresponding keyway 67 in collar 53.

When the paper 21 is to be unloaded from the drum, lever 23 is pushed to the left which, in turn, pushes collar 53 to the left against the sleeve 59, allowing shaft pin 62 to enter the notch 58. It is clear, therefore, that the lever 23 can never be pushed far enough to couple the lug 66 with the keyway 67 unless the drum 11 is stopped in exactly the correct position for loading. Assuming therefore that the drum has been stopped as above described by the movement of the lever 23 to the left, then when said lever is pushed further to the left the lug 66 enters the keyway 67, thus enabling the camming sleeve 35 to be rotated by rotation of the lever in the vertical guide portion 68 of the lever slot. When lever 23 enters the beginning of slot 68, the sleeve 59 has been pushed to the left so that the pin 62 enters the slot 64, allowing lever 23 to be turned, and in doing so it rotates the camming sleeve 35, while the drum shaft 15 and pin 62 remain stationary. The rotation of sleeve 35 operates the paper clamping and stripping elements 25, 26 from their respective positions shown in Figs. 4 and 6 to the positions shown in Figs. 5 and 7.

Figure 8:
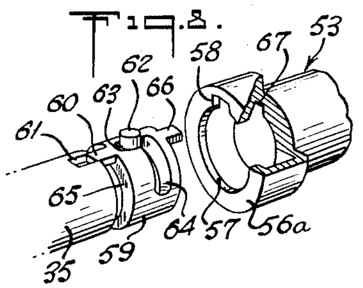
Fig. 8 is an exploded perspective view of part of Fig. 1.

When lever 23 is turned back to the bottom of slot 68 at the end of the loading operation, the camming sleeve 35 is turned to the position shown in Figs. 4 and 6, thus causing the gripper elements to grip the edge of the sheet 21 and causing the stripping elements 26 to be retracted. At this time also pin 62 is again aligned with the slot 63, and spring 65 pushes the sleeve 59 to a position where it is held by pin 62 as shown in Fig. 8. When the lever 23 is released, spring 56 restores the lever to its normal position shown in Figs. 1 and 3 and disengages the collar 53 from the camming sleeve 35. The sleeves 59 and 69 are pinned to shaft 49 so that on the restoration of the lever 23 to its normal position, the plate 20 engages switch 19 and causes the withdrawal of the latch 17 out of the path of the stop lug 16, thus permitting the drum to rotate.

While one particular embodiment and arrangement of parts have been disclosed, it will be understood that various changes and modifications may be made therein without departing from the spirit and scope of the invention. For example, while the invention has been described in connection with a facsimile scanning machine wherein one edge only of the paper is clamped against the drum surface and wherein the drum is rotated in the direction of the arrow, as seen in Fig. 4 for example, thus leaving the opposite edge of the paper unclamped; it will be understood that if desired each of the clamping elements 25 may have fingers 32 projecting therefrom in opposite directions so as to clamp the opposite ends of a paper sheet which may be wrapped around the drum.

What is claimed is:

1. A facsimile machine of the kind having a rotatable scanning drum around which a sheet is to be removably wrapped and clamped, a sheet clamping member for holding one edge of the sheet against the drum, a sheet stripping member, said drum having a coaxial shaft extending interiorly along the drum and on which said clamping and stripping members are mounted, both of said members being in the form of elongated leaf springs having free ends which pass in a substantially radial direction through respective openings in the drum wall, the remainder of each leaf spring being flexed at an angle for engaging an operating member, said operating member being in the form of a cam sleeve for controlling the flexure of said leaf springs and mounted concentrically within the drum and having an end extending beyond one end of the drum, said cam sleeve extending along said shaft and in engagement with said flexed portion of each leaf spring for controlling said flexure, manually operable means separate from said drum and having a portion selectively movable into and out of engagement with the said end of said operating member to operate said member and thereby to move said clamping and stripping members in substantial unison whereby the movement of said clamping member into non-clamping position is accompanied by movement of said stripping member into stripping position.

2. In combination a hollow rotatable drum to support and hold a record sheet and the like, a shaft extending coaxially through said drum, a plurality of spring fingers fastened to said shaft, each of said fingers being in the form of a spring having a first portion extending from the shaft into an opening in the drum wall, and another portion bent-back upon itself at an angle to the first portion with only one leg of the bent-back portion fastened to the shaft whereby the spacing between the legs of the bent-back portion can be changed to control the movement of said first portion with respect to said opening in the drum wall, and cam means rotatable on said shaft for controlling the spacing between the said legs of said bent-back portion and thereby to control the movement of the end of the first portion with respect to the drum opening.

3. The combination according to claim 2 in which one of said spring fingers is a sheet clamping finger and the other of said fingers is a sheet stripping finger, and in which the said legs of the said bent-back portions of both spring fingers are normally biased towards each other whereby the end of the clamping finger is out of sheet clamping relation with the drum and the end of the stripping finger is out of sheet stripping relation with the drum, and said cam means comprises a pair of camming shoulders angularly displaced around said shaft whereby turning of said camming member on said shaft causes the sheet clamping finger to be moved into sheet clamping relation with the drum while allowing the sheet stripping finger to retract itself within the drum and whereby rotation of the camming member on the shaft in the opposite direction causes the sheet stripping finger to be protruded from the drum while allowing the sheet clamping finger to protrude from the drum by reason of said bias.

4. The combination according to claim 2 in which the bent-back portion of each of the spring fingers extends from the said shaft into engagement with the inner wall of the drum.

5. In combination a hollow rotatable drum to support and hold a record sheet and the like, a shaft extending coaxially through the drum for rotation therewith, a cam sleeve concentric on said shaft but capable of rotation therearound, a camming shoulder on said sleeve, a spring finger having one end fastened to said shaft and bent-back upon itself at an angle with relation to the remainder of the finger and with one leg of the bent-back portion in engagement with said shoulder, the opposite end of the spring finger extending into an opening in the drum wall, means to rotate said cam sleeve to a position wherein said shoulder varies the spacing between the legs of the said bent-back portion of the finger and thereby to vary the extent of protrusion of the said opposite end of the finger with respect to the drum opening.

6. The combination according to claim 5 in which a plurality of said spring fingers are attached to said shaft along the length thereof with respective points of attachment displaced around the shaft, and said cam sleeve has a corresponding plurality of notches defining respective camming shoulders likewise displaced around the sleeve, the bent-back portion of each spring finger being located in a corresponding one of said notches whereby rotation of the camming sleeve around the shaft causes the first mentioned end of one spring finger to be moved to sheet clamping relation with respect to the drum and the first mentioned end of the other spring finger to be retracted within the drum.

7. Apparatus for clamping and stripping a sheet with respect to the surface of a hollow rotatable sheet supporting drum, comprising a shaft extending coaxially through the drum, a spring finger having one end fastened to the shaft and bent-back upon itself with the legs of the bent-back portion normally biased towards each other, the remainder of the spring finger extending at an angle to the bent-back portion whereby the extremity of the said remainder of the finger bears a predetermined fixed relation with respect to the drum surface, a camming sleeve coaxially surrounding said shaft and having a camming shoulder for varying the spacing between said legs and thereby to control the relation of the said extremity of the finger with respect to the drum surface.

References Cited in the file of this patent

UNITED STATES PATENTS

| | | |
|---|---|---|
| 2,231,109 | Breuer et al. | Feb. 11, 1941 |
| 2,514,974 | Schauer | July 11, 1950 |
| 2,647,462 | Dell | Aug. 4, 1953 |